United States Patent
Levi

(10) Patent No.: US 9,506,292 B2
(45) Date of Patent: Nov. 29, 2016

(54) DOOR MOUNTED LADDER FOR CARGO VANS

(71) Applicant: Avraham Y. Levi, Eagan, MN (US)

(72) Inventor: Avraham Y. Levi, Eagan, MN (US)

(73) Assignee: ROM ACQUISITION CORPORATION, Belton, MO (US)

( * ) Notice: Subject to any disclaimer, the term of this patent is extended or adjusted under 35 U.S.C. 154(b) by 47 days.

(21) Appl. No.: 14/429,273

(22) PCT Filed: Sep. 10, 2013

(86) PCT No.: PCT/US2013/058878
§ 371 (c)(1),
(2) Date: Mar. 18, 2015

(87) PCT Pub. No.: WO2014/046902
PCT Pub. Date: Mar. 27, 2014

(65) Prior Publication Data
US 2015/0252618 A1  Sep. 10, 2015

Related U.S. Application Data

(60) Provisional application No. 61/702,548, filed on Sep. 18, 2012.

(51) Int. Cl.
*E06C 5/02* (2006.01)
*E06C 5/24* (2006.01)
*B60R 3/00* (2006.01)

(52) U.S. Cl.
CPC ............... *E06C 5/02* (2013.01); *B60R 3/005* (2013.01); *E06C 5/24* (2013.01)

(58) Field of Classification Search
CPC ........... E06C 5/02; E06C 5/24; B60R 3/005; B60R 3/007
See application file for complete search history.

(56) References Cited

U.S. PATENT DOCUMENTS

| 2,485,413 | A | * | 10/1949 | Ross | B60R 3/007 182/201 |
| 3,498,410 | A | * | 3/1970 | Storch | B63B 27/14 182/159 |
| 4,249,683 | A | * | 2/1981 | Park | B62D 43/02 182/129 |
| 4,320,816 | A | * | 3/1982 | Callahan | E04G 3/18 182/55 |
| 4,825,975 | A | * | 5/1989 | Symes | B60R 3/007 182/150 |
| D442,289 | S | * | 5/2001 | Ziaylek, Jr. | D25/64 |
| 6,837,338 | B2 | | 1/2005 | Grover | |
| 6,913,114 | B1 | | 7/2005 | Blehm | |
| 7,178,769 | B2 | * | 2/2007 | Magnusson | A47B 96/1416 211/119.004 |
| 8,870,148 | B2 | * | 10/2014 | Hickman | A47B 97/04 211/119.004 |
| 2006/0108179 | A1 | * | 5/2006 | Sieb | B60R 3/005 182/127 |

(Continued)

FOREIGN PATENT DOCUMENTS

| JP | 07011447 | 2/1995 |
| JP | 11235951 | 8/1999 |

*Primary Examiner* — Alvin Chin-Shue
*Assistant Examiner* — Kristine Florio
(74) *Attorney, Agent, or Firm* — Nikolai & Mersereau, P.A.; Thomas J. Nikolai

(57) ABSTRACT

A ladder specially designed for attachment to a rear door of a cargo van to facilitate the ability of a person to climb onto the vehicle's roof. The ladder has two parallel rails joined by a plurality of transversely extending rungs. Affixed to the upper and lower ends of the ladder rungs are length adjustable brackets supporting door engaging clips designed to fit about the upper and lower edges of a van door without interfering with the ability of the door to open and close. The ladder rails are preferably bent to conform to the contour of the van door.

9 Claims, 5 Drawing Sheets

(56) References Cited

U.S. PATENT DOCUMENTS

| | | | |
|---|---|---|---|
| 2008/0087496 A1* | 4/2008 | Graffy | E06C 5/02 182/93 |
| 2010/0096215 A1* | 4/2010 | McFarlane | B60R 3/007 182/106 |
| 2010/0258379 A1 | 10/2010 | Mickens | |
| 2010/0270246 A1* | 10/2010 | Rodriguez | A47B 96/16 211/34 |

* cited by examiner

DOOR MOUNTED LADDER FOR CARGO VANS

CROSS REFERENCE TO RELATED APPLICATION

This application is a 371 of International application no. PCT/US2013/058878, filed Sep. 10, 2013, which claims priority to U.S. provisional application Ser. No. 61/702,548, filed Sep. 18, 2012, the contents of which are hereby incorporated by reference.

BACKGROUND OF THE INVENTION

1. Field of the Invention

This invention relates generally to commercial cargo van-style vehicles, and, more particularly, to a ladder adapted to be clamped to a rear access door of such vehicles to allow convenient access by a work person to a roof area of the vehicle.

2. Discussion of the Prior Art

Various automotive vehicle manufacturers offer cargo vans for carrying supplies and tools to a work site. Such vans have a raised roof sufficiently high to allow an adult worker to stand upright within the vehicle's box and a pair of rear access doors that are hinged to the vehicle's sidewalls along rear edges thereof and which, when swung closed, meet and latch at a midline of the vehicle's rear end. Frequently, such vans will be equipped with a roof rack on which items, such as extension ladders, step ladders and other tools, are carried. Due to the height of the roof, typically about six to seven feet above the ground, it is difficult to reach the rooftop for placement and removal of objects intended for rooftop storage.

To solve this problem, the present invention provides a ladder that is generally universally attachable to one of the rear doors of the vehicle whereby a worker can safely climb onto the vehicle's roof

SUMMARY OF THE INVENTION

The present invention comprises a ladder, preferably fabricated from aluminum, having a pair of elongated side rails held in parallel, spaced-apart relation by a plurality of transversely extending longitudinally spaced apart rungs and where the side rails are appropriately bent along their length to better conform to the contour profile of a vehicle door on which the ladder is adapted to be mounted. Adjustable brackets are attached to the upper and lower ends of the ladder side rails with clips for clamping to the top and bottom edge portions of one of the vehicle's rear doors to thereby rigidly mount the ladder to the vehicle door.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views referred to corresponding parts.

DESCRIPTION OF THE PREFERRED EMBODIMENT

Figure 1:
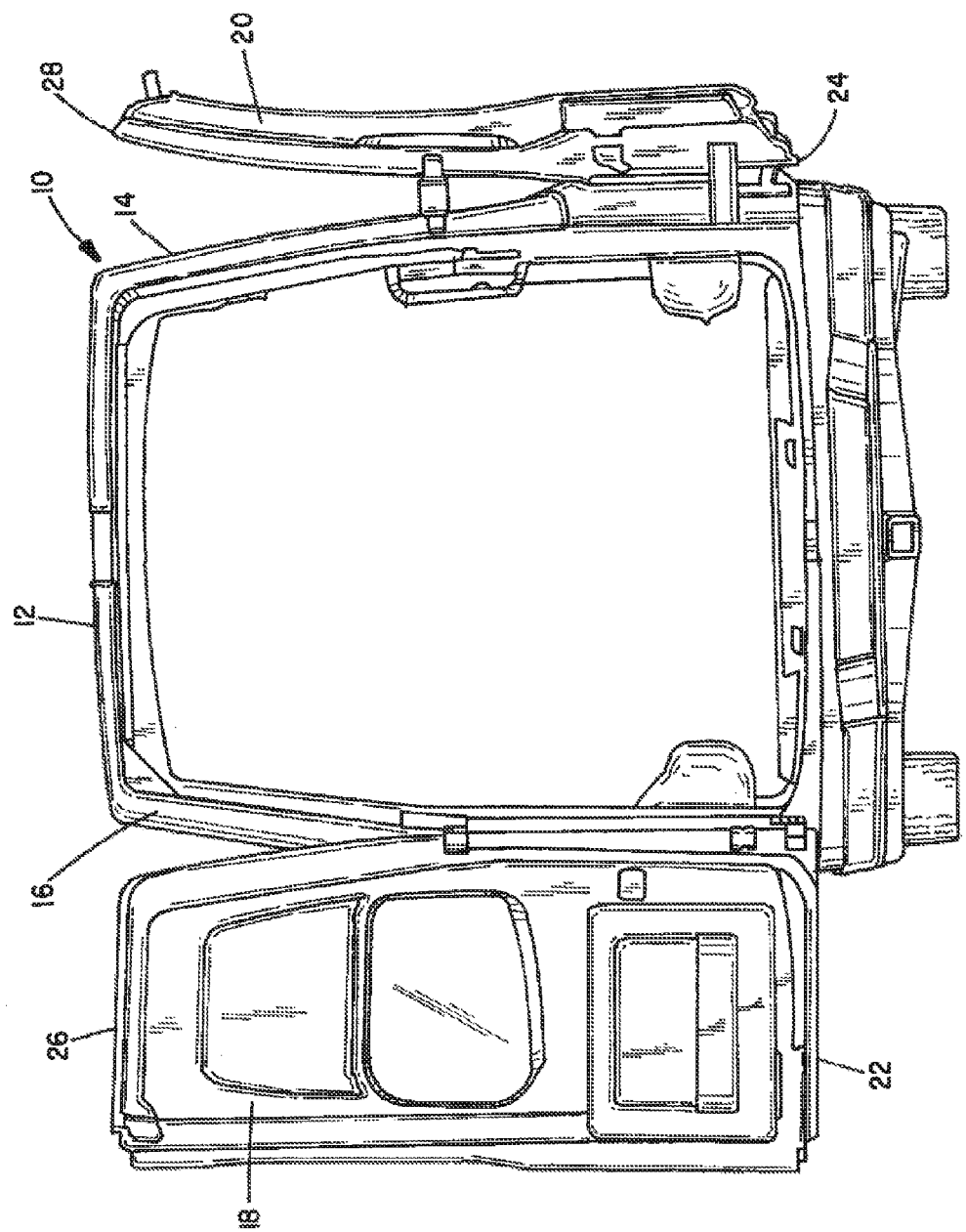
FIG. 1 is a perspective rear view of a typical prior art cargo van on which the present invention finds use.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

FIG. 1 illustrates a rear view of a conventional cargo van with which the present invention finds use. It illustrates the van with the rear doors open and, as can be seen by the view, the roof of the van is sufficiently elevated relative to its floor so that a workman may stand erect within the van's box. The van is indicated generally by numeral 10 and has a roof structure 12, sidewalls 14 and 16, and with left and right rear doors 18 and 20 hinged to the sidewalls 16 and 14, respectively.

Looking closely at the bottoms of the doors 18 and 20 in FIG. 1, an edge portion 22 of the left door's sheet metal front panel extends down a short distance below the inside rear bottom edge of the door. This can also be seen at 24 on the right rear door 20. While somewhat difficult to see in the view of FIG. 1, the top edge of the door's front panel also extends slightly above the inner rear door panel, as at 26 and 28. Also, by viewing the door 20, it can be seen that the sheet metal front panel of that door is contoured such that approximately the lower half thereof is generally vertically oriented and then the upper approximately half curves such that when the door are closed, that upper portion slopes in a forward direction.

Figure 2:
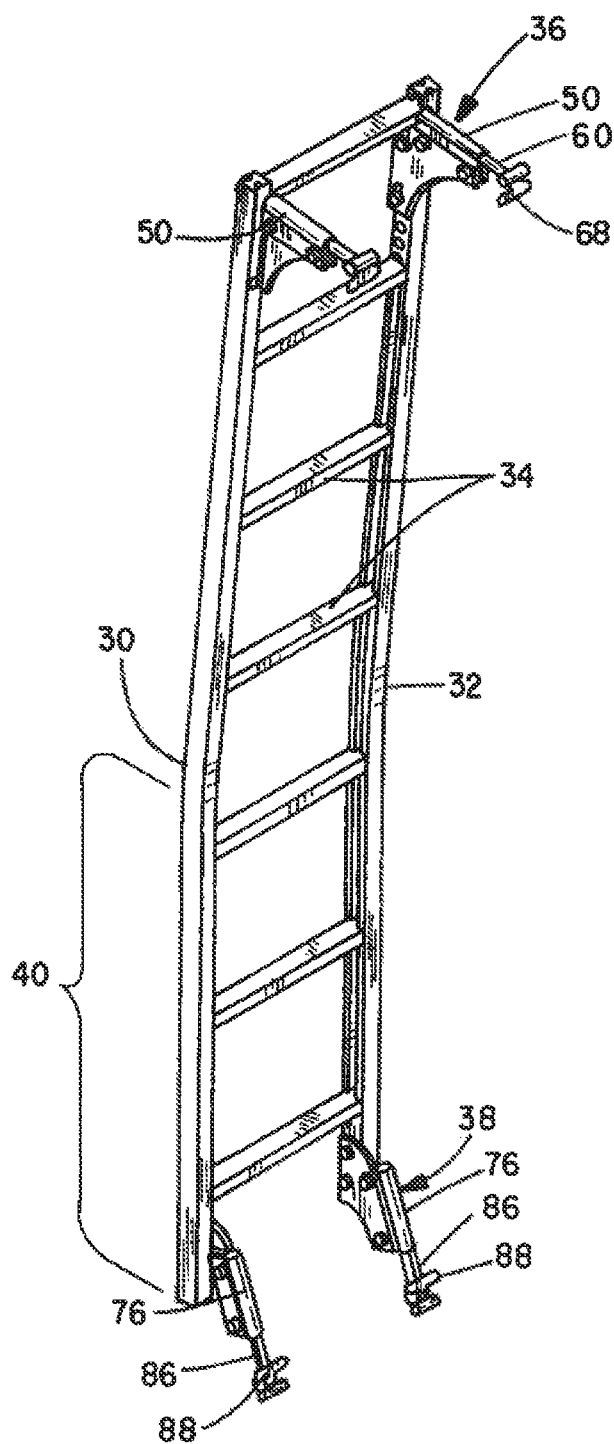
FIG. 2 is a perspective view of a van door mountable ladder comprising a preferred embodiment of the present invention.

FIG. 2 is a perspective view of the ladder comprising a preferred embodiment of the present invention. It is seen to comprise first and second longitudinally extending aluminum rails 30 and 32 that are held in parallel, spaced-apart relation by a plurality of transversely extending, longitudinally spaced-apart rungs 34. Attached to the upper end portion of each of the rails 30 and 32 is a pair of upper end door-mounting bracket devices 36 and, likewise, affixed to the lower end of the rails 30 and 32 are door-bottom mounting bracket devices 38.

With continued reference to FIG. 2, it will be noted that the rails 30 and 32 rise generally vertically over a length identified by bracket 40 and then bend slightly in a forward direction, thus, following the contours of the exterior of the doors 18 and 20.

Figure 3:
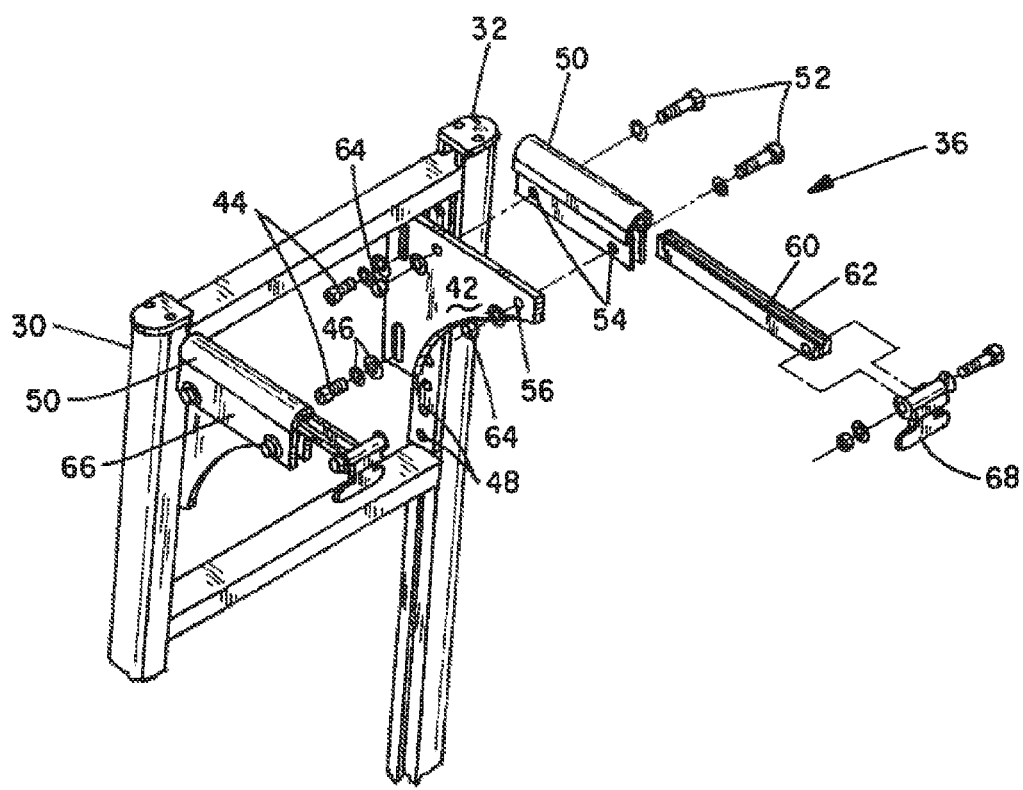
FIG. 3 is an exploded detailed view of the clamping structure for engaging a top edge of a van door.

Turning next to FIG. 3, there is shown an exploded detailed view of the upper door-edge mounting bracket devices 36. Bolted or otherwise affixed to the upper end portions of the ladder rails 30 and 32 are mounting plates, as at 42. More particularly, bolts, as at 44, extend through washers 46 into selected ones of a series of regularly spaced threaded bores 48 that are formed through the rails 30 and 32 such that the placement of the mounting brackets 42 is adjustable over a limited range along the length dimension of the rails. A somewhat tubular clamp member 50 is adapted to be affixed to each of the bracket-mounting plates 42 by bolts 52 that pass through bores 54 and 56 in the legs of the tubular clamp 50 and the mounting bracket 42, respectively.

Figure 5:
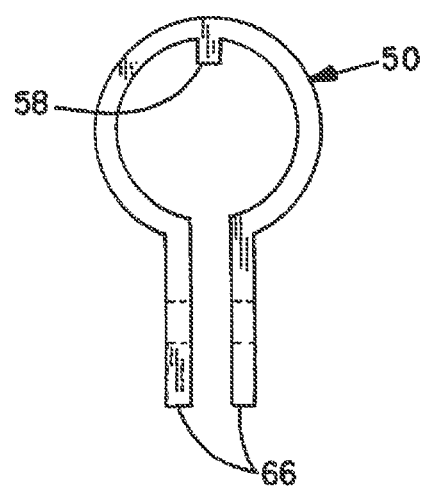
FIG. 5 is an end view of the tubular mounting bracket shown in FIG. 3.

FIG. 5 is an end view of the extrusion comprising the tubular mounting bracket 50 and it is seen to include an inwardly protruding key 58, which is adapted to mate with a keyway groove 60 formed in an insert rod 62 adapted to fit into the tubular opening of the bracket 50. In this fashion, the degree of extension of the rod 62 from the tubular bracket 50 can be adjusted and then fixed when the bolts 52 are tightened into the nuts 64 which serve to compress the legs 66 of the bracket member 50 together and reduce the I.D. of the tubular portion thereof. Bolted to the outer end of the rod 62 is a clip 68 which is arranged to engage the upper portion 26 of the vehicle's door as seen in FIG. 1.

Figure 4:
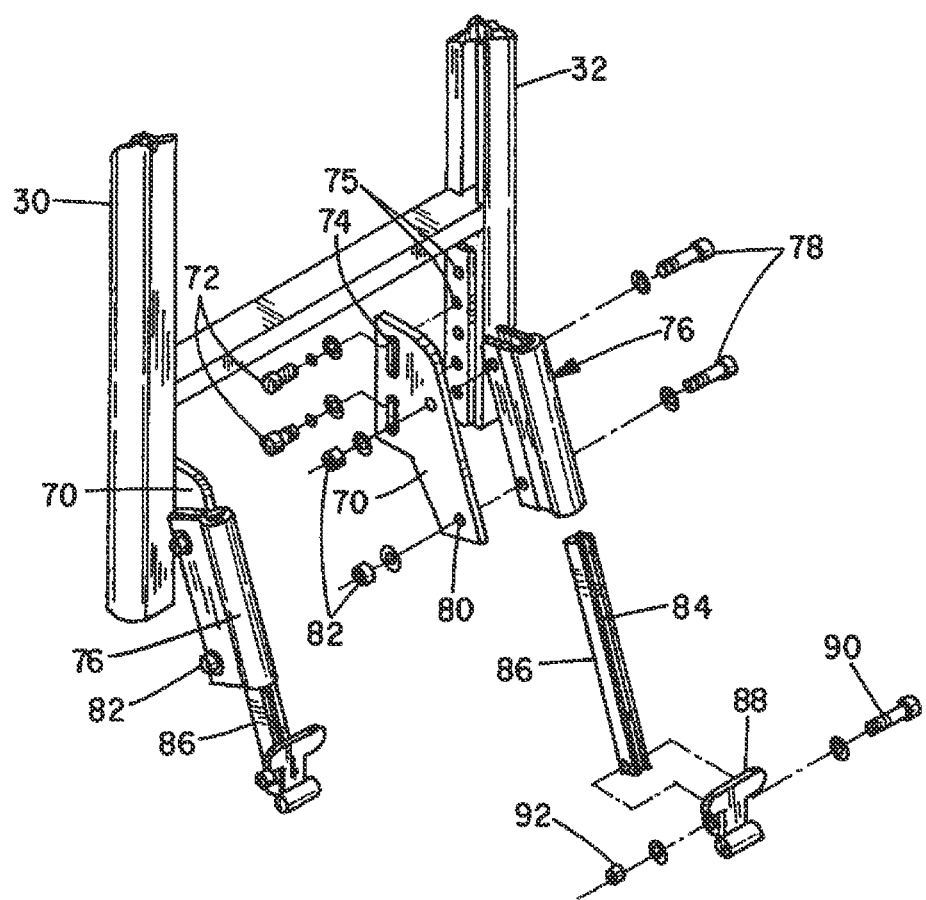
FIG. 4 is an exploded detailed view of the clamping structure for engaging a bottom edge of a van door.

Referring next to FIG. 4, there is shown a similar arrangement for securing the bottoms of the ladder rails 30 and 32 to the lower edge 22 or 24 on the vehicle's rear door 18 or 20. As in the attachment arrangement shown in FIG. 3, the lower ladder attachment bracket assemblies include an attachment plate 70 of a somewhat different shape attached to each of the ladder rails 30 and 32 by bolts 72 that pass through washers and slotted apertures 74 into selected ones of the threaded bores 75 formed in the ladder rails. The mounting plates 70 provide a means whereby a tubular mounting bracket 76 can be attached by bolts, as at 78, that extend through apertures in the legs of the tubular mounting bracket 76 and through apertures, as at 80, formed in the mounting plate to be secured by nuts, as at 82. The tubular mounting bracket 76 has an end view like that shown in FIG. 5 including a key 58 for cooperating with a keyway or groove 84 formed in a rod 86. Again, the extent to which the rod 84 projects out from the tubular mounting bracket 76 is slideably adjustable and then can be rigidly secured upon tightening of the bolts 78 into the nuts 82.

Affixed to the outer end of the rod 86 is a clip member 88 which fastens to the rod 86 by means of a bolt 90 that is arranged to pass through aligned apertures in the clip 88 and the rod 86. A nut 92, when tightened on to the bolt 90, establishes a rigid connection with the end of the rod 86.

In assembling a ladder on to the door 18 or 20 of the van, the ladder will be suspended from the upper edge of the door 26 or 28 by the upper door-edge mounting bracket devices 36 illustrated in FIG. 3 with the clips 68 fitted over and engaging the upper edges 26 or 28 of door. Then, the rods 86 of the lower door-edge ladder attachments will be inserted into the tubular brackets 76 and raised therein until the clips 88 fit behind and engage the lower edge 22 or 24 of the vehicle's rear doors. At this point, all bolts as at 90, 78, and 52 will be tightened to rigidly clamp the ladder to a selected one of the vehicle's rear door. The upper and lower ladder attachment brackets are designed so as not to mar the vehicle's doors in any way while yet rigidly securing the mounting ladder to the vehicle at a location so that it can be easily climbed to reach the exterior roof area of the cargo van.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A ladder adapted for attachment to a rear door of a cargo van comprising:
   (a) a pair of longitudinally extending side rails held in parallel, spaced-apart relation by a plurality of regularly spaced-apart, transversely extending rungs;
   (b) first and second bracket plates attached to lower end portions of the pair of side rails and third and fourth bracket plates attached to upper end portions of the pair of side rails;
   (c) first and second clamp tubes secured to the first and second bracket plates and third and fourth clamp tubes secured to the third and fourth bracket plates and where each clamp tube defines a lumen;
   (d) first, second, third and fourth extension rods insertable into respective ones of the lumens of the first, second, third and fourth clamp tubes;
   (e) first and second upwardly projecting tabs affixed to an outer end portion of the first and second extension rods adapted to engage a lower edge of said rear door; and
   (f) third and fourth downwardly projecting tabs affixed to an outer end portion of the third and fourth extension rods adapted to engage an upper edge of said rear door.

2. The ladder as in claim 1 wherein the first, second, third and fourth tabs are sufficiently thin to allow the door to fully close and latch when engaging respective lower and upper edges of the door.

3. The ladder as in claim 2 wherein the first, second, third and fourth bracket plates are longitudinally positionable over a limited range on the side rails.

4. The ladder as in claim 2 wherein the degree of extension of the extension rods out from the lumens of the clamp tubes is adjustable prior to application of a clamping force to the clamp tubes.

5. The ladder as in claim 4 wherein the extension rods are keyed to be non-rotatable in the clamp tubes.

6. The ladder as in claim 1 wherein the side rails are shaped to conform to an external contour of the rear door of the cargo van.

7. The ladder as in claim 1 wherein the clamp tubes are generally of a U-shaped cross section with a pair of spaced-apart legs extending from a generally circular body portion such that when the legs are forced together, an inner diameter of the circular body portion is made to decrease.

8. The ladder as in claim 7 wherein the legs have aligned apertures for receiving a clamping bolt therethrough.

9. The ladder of claim 1 wherein the tabs are bolted to the end portions of the extension rods.

* * * * *